(No Model.)
J. F. SULLIVAN.
COMBINATION TOOL.
No. 472,147. Patented Apr. 5, 1892.
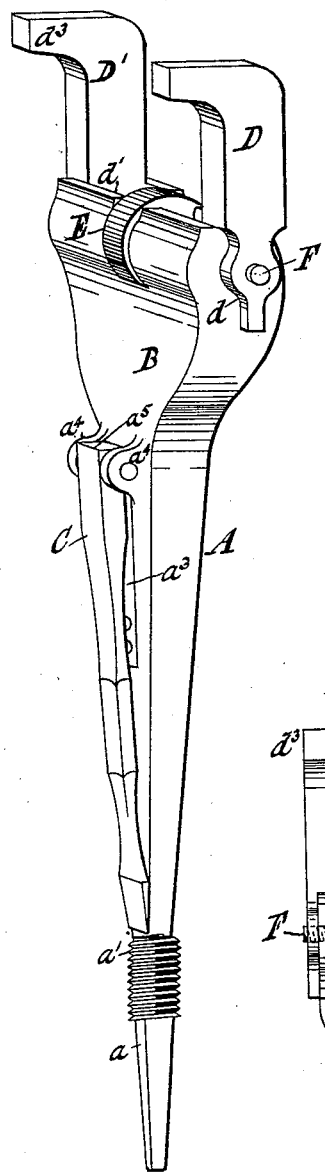
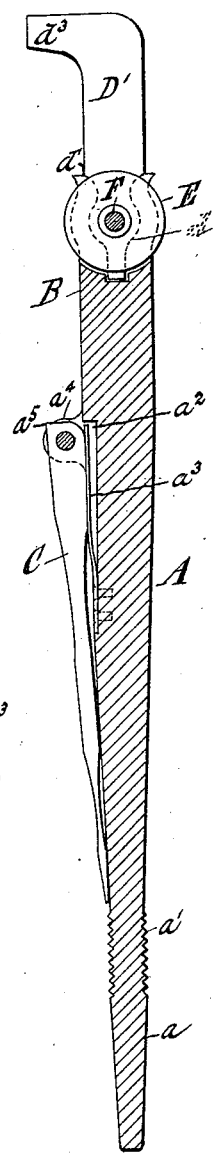
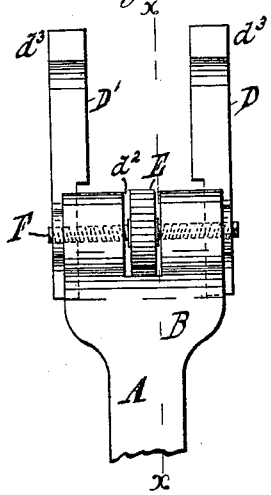
Witnesses
K. E. Pembleton.
George Hoof.
Inventor
Jeremiah F. Sullivan
By his Attorney
Edmund Griswold

UNITED STATES PATENT OFFICE.

JEREMIAH F. SULLIVAN, OF BROOKLYN, NEW YORK.

COMBINATION-TOOL.

SPECIFICATION forming part of Letters Patent No. 472,147, dated April 5, 1892.

Application filed March 13, 1890. Serial No. 343,797. (No model.)

*To all whom it may concern:*

Be it known that I, JEREMIAH F. SULLIVAN, of Brooklyn, county of Kings, in the State of New York, have invented a certain new and useful Improvement in Combination-Tools, of which the following is a specification.

My improvement relates to tools to which a handle may be secured in order that they may be rotated. Such a handle may be of any suitable kind—such, for instance, as a brace.

I will describe a tool embodying my improvement in detail, and then point out the novel features in claims.

In the accompanying drawings, Figure 1 is an elevation in perspective of a tool embodying my improvement. Fig. 2 is a vertical section of the same. Fig. 3 is a face view of the upper part of the tool.

Similar letters of reference designate corresponding parts in all the figures.

A designates the shank. This shank is provided near one end with a head B and at its other end $a$ is so shaped as to be received within a rectangularly-shaped socket in a tool-handle. (Not shown.) Inward of the portion $a$ I have shown a screw-threaded portion $a'$. The portion $a$ may be received within a brace of any suitable kind; but it may be received within any ordinary handle having a rectangularly-shaped aperture formed in one end. A handle may be employed, also, having an internally-screw-threaded socket near one end, which engages the screw-threaded portion $a'$.

I have shown as pivoted upon one side of the shank A a screw-driver C, which screw-driver is adapted to be swung downwardly into the position shown against the shank or to be swung upwardly between jaws D D'. I have shown the shank A as recessed at $a^2$ and a flat spring $a^3$ arranged in said recess. Near the outer or free end of the spring $a^3$ the shank A is provided with lugs or projections $a^4$, to which lugs or projections the screw-driver C is pivoted. The portion of the screw-driver adjacent to where it is pivoted to the lugs or projections $a^4$ is flattened at its sides and is provided intermediate of said flattened sides with a cam-like projection $a^5$. When the screw-driver is swung upwardly or downwardly, the cam-like portion $a^5$ acts against the resistance of the spring $a^3$, and when the screw-driver has been brought into either its uppermost or lowermost positions the spring will bear against the flat sides of the screw-driver referred to and will serve to assist in maintaining the screw-driver in the position into which it has been adjusted.

The head B of the tool is provided in a direction at right angles to the length of the shank A with guideways $d\ d'$. I have shown these guideways as substantially ogee-shaped upon their inner surfaces; but any other suitably-shaped guideways might be used. Within these guideways are arranged the lower portions of the jaws D D'. Such lower portions of the jaws are shaped substantially like the guideways $d\ d'$ and are adapted to be slid freely to and fro within said guideways, so as to be moved toward and from each other. Between the guideways $d\ d'$ the metal is cut away substantially at right angles to the lengths of said guideways, as at $d^2$. Within the opening formed by this cutting away of the metal is arranged a hand-wheel E. To this hand-wheel is secured axially a right and left hand screw F, which screw engages suitable screw-threaded apertures in the lower portions of the jaws D D'. The screw being fast in the hand-wheel E, it will be readily seen that when the latter is rotated the jaws D D' will be brought nearer to or farther from each other.

In the example illustrated the jaws D D' are provided upon one side, near their upper ends, with projections $d^3$. These projections extend from the same sides of the jaws D D'. If the screw-driver C be swung up between the jaws D D' and the latter be moved toward each other sufficiently far, they will firmly grasp the screw-driver and hold it in position. The real feature of my improvement, however, is to enable the use of a tool such as I have described in placing nuts upon bolts and removing them therefrom. A nut having been placed between the jaws and the jaws brought together to clamp it, it may then readily be applied to a bolt by merely rotating the handle. If a brace is used, the work may be done very rapidly. To loosen a nut, it is of course but necessary to grip the same between the jaws D D' and rotate the two in the reverse direction. The projections $d^3$ upon the jaws D D' are particularly advantageous where a nut is to be placed upon a bolt or to be removed therefrom, which bolt when the nut is set in position would ordinarily extend downwardly sufficiently far to contact with the hand-wheel E. By grasping the nut between the portions $d^3$ of the jaws the bolt will extend past the hand-wheel without making any contact therewith.

It will be seen that by my improvement I provide a very simple tool, which may be used with a brace or other handle and which can be inserted into corners and out-of-the-way places for the purpose of manipulating the nuts upon bolts where it would be impracticable to use a wrench of ordinary construction. The tool may also be used as a screw-driver, as described.

What I claim as my invention, and desire to secure by Letters Patent, is—

1. In a tool adapted to be secured to and detached from a handle, the combination, with a shank provided with a head having guideways extending transversely to the direction of the length of the shank, of jaws arranged to slide in said guideways, said jaws having projections, as $d^3$, near their upper ends, a right and left hand screw for moving said jaws toward and from each other, and a hand-wheel for operating said screw, substantially as specified.

2. In a tool adapted to be secured to and detached from a handle, the combination, with a shank provided with a head having guideways extending transversely to the direction of the length of the shank, of jaws arranged to slide in said guideways, said jaws having projections, as $d^3$, near their upper ends, a right and left hand screw for moving said jaws toward and from each other, a hand-wheel for operating said screw, and a screw-driver pivoted upon said shank and adapted to be swung into a position to be grasped by said jaws, substantially as specified.

JEREMIAH F. SULLIVAN.

Witnesses:
K. E. PEMBLETON,
GEORGE HOF.